United States Patent
Polivka

(10) Patent No.: US 11,250,984 B2
(45) Date of Patent: Feb. 15, 2022

(54) METHODS AND APPARATUS FOR BIASING A MAGNETIC CIRCUIT TO REDUCE AUDIBLE NOISE FROM A SWITCHING POWER SUPPLY

(71) Applicant: Power Integrations, Inc., San Jose, CA (US)

(72) Inventor: William M. Polivka, Campbell, CA (US)

(73) Assignee: POWER INTEGRATIONS, INC., San Jose, CA (US)

(*) Notice: Subject to any disclaimer, the term of this patent is extended or adjusted under 35 U.S.C. 154(b) by 167 days.

(21) Appl. No.: 16/822,342

(22) Filed: Mar. 18, 2020

(65) Prior Publication Data

US 2020/0381165 A1    Dec. 3, 2020

Related U.S. Application Data

(60) Provisional application No. 62/855,475, filed on May 31, 2019.

(51) Int. Cl.
| H01F 27/00 | (2006.01) |
| H01F 27/24 | (2006.01) |
| H02M 3/335 | (2006.01) |
| H01F 27/28 | (2006.01) |

(52) U.S. Cl.
CPC ............ *H01F 27/24* (2013.01); *H01F 27/28* (2013.01); *H02M 3/33523* (2013.01)

(58) Field of Classification Search
CPC .... H01F 27/24; H01F 27/28; H01F 2029/143; H02M 3/33523
See application file for complete search history.

(56) References Cited

U.S. PATENT DOCUMENTS

| 6,348,848 B1 * | 2/2002 | Herbert ..................... H01F 3/12 323/308 |
| 6,980,077 B1 * | 12/2005 | Chandrasekaran ... H01F 27/255 336/212 |

* cited by examiner

*Primary Examiner* — Adolf D Berhane
*Assistant Examiner* — Afework S Demisse
(74) *Attorney, Agent, or Firm* — Brian H. Floyd

(57) ABSTRACT

Presented herein are methods and apparatus for biasing magnetic circuits to reduce audible noise from a switching power supply. A magnetic component (e.g., a magnet) is constructed and provided to a core (e.g., a ferromagnetic core) to offset (i.e., bias) an applied magnetomotive force. By selecting and/or manufacturing the magnetic component based on a circuit operating condition, the offset may be tailored to advantageously shift a frequency of mechanical deformation outside the audible noise range. In a switching power supply with fixed peak current, the offset to the applied magnetomotive force may be determined, at least in part, by the fixed peak.

20 Claims, 13 Drawing Sheets

METHODS AND APPARATUS FOR BIASING A MAGNETIC CIRCUIT TO REDUCE AUDIBLE NOISE FROM A SWITCHING POWER SUPPLY

CROSS-REFERENCE TO RELATED APPLICATIONS

This application claims the benefit of U.S. Provisional Application No. 62/855,475, filed on May 31, 2019, incorporated in its entirety herein by reference.

FIELD OF THE DISCLOSURE

The present invention relates to providing magnetic bias in a magnetic circuit of a switching power supply and more particularly to providing magnetic bias to reduce audible noise from a power supply.

BACKGROUND INFORMATION

Many electronic devices, such as mobile phones, laptop computers, etc., are powered by direct current (dc) power derived from a power supply. Conventional wall outlets generally deliver a high voltage alternating current (ac) power that needs to be converted to regulated dc power in order to be used as a power source for consumer electronic devices. Switch mode converters, also referred to as switching power supplies, are commonly used due to their high efficiency, small size, and low weight to convert a high voltage ac power to a regulated dc power.

Switching power supplies may also include magnetic circuits to transfer energy. Magnetic circuits are analogous to electric circuits. For instance, a magnetic circuit provides a circuit path for magnetic flux; and an applied magnetomotive force, analogous to an electromotive force, forces magnetic flux along the magnetic circuit path.

Some magnetic components include ferromagnetic materials. Ferromagnetic materials, including ferrites, respond mechanically to magnetic fields according to a process of magnetostriction. Magnetostriction is a property giving rise to variation in a magnetic material's shape (e.g., length) in response to variations of an applied magnetic field.

BRIEF DESCRIPTION OF THE DRAWINGS

Non-limiting and non-exhaustive embodiments of biasing magnetic circuits to reduce audible noise from a switching power supply are described with reference to the following figures, wherein like reference numerals refer to like parts throughout the various views unless otherwise specified.

Figure 1A:
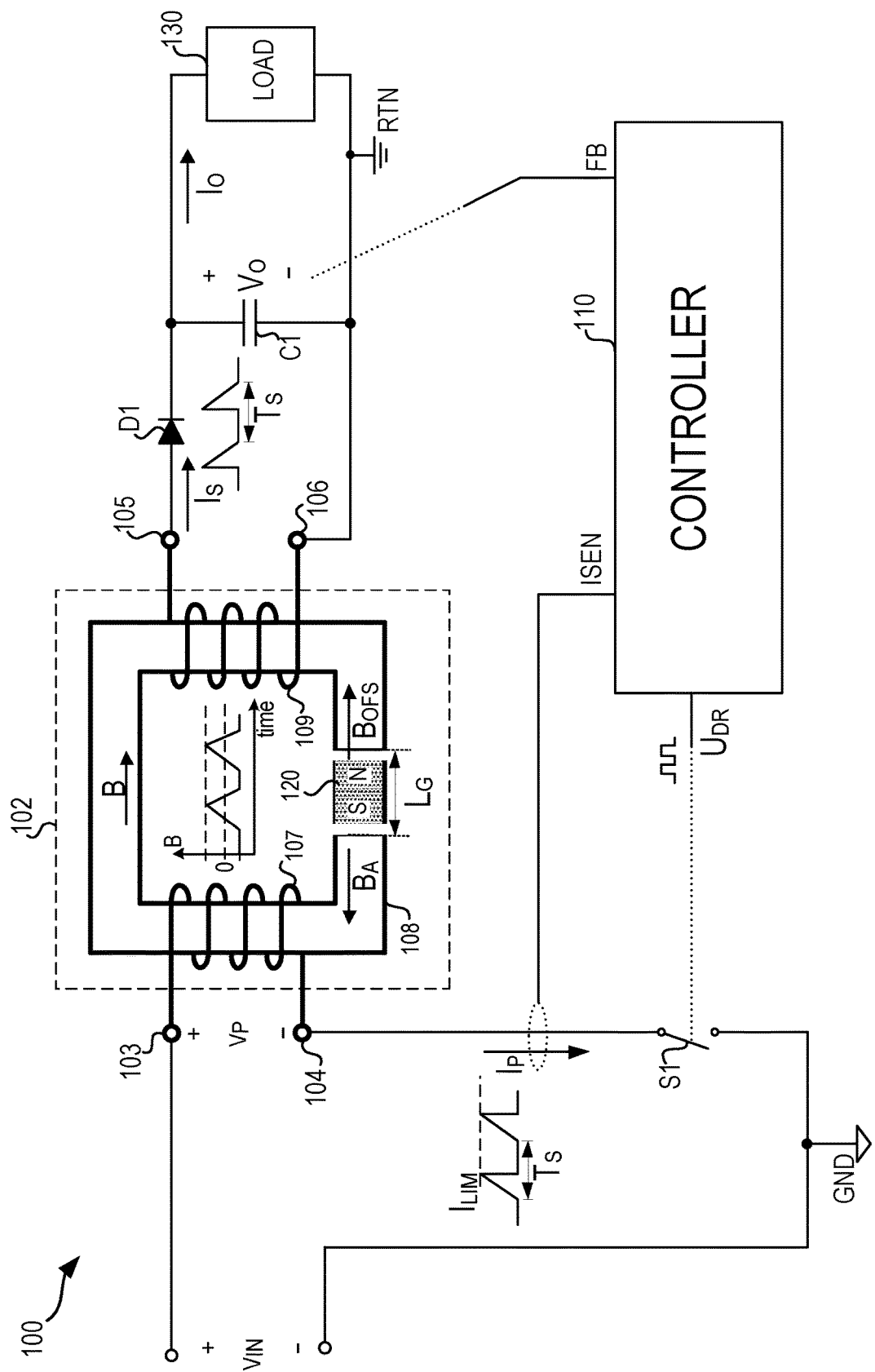
FIG. 1A illustrates a switching power supply including a magnetic circuit according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the teachings herein. Also, common but well-understood elements that are useful or necessary in a commercially feasible embodiment are often not depicted in order to facilitate a less obstructed view of these various embodiments of biasing magnetic circuits to reduce audible noise from a switching power supply.

DETAILED DESCRIPTION

In the following description, numerous specific details are set forth in order to provide a thorough understanding of biasing magnetic circuits to reduce audible noise from a switching power supply. It will be apparent, however, to one having ordinary skill in the art that the specific detail need not be employed to practice the teachings herein. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of biasing magnetic circuits to reduce audible noise from a switching power supply. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments an integrated controller circuit may be used to drive a power switch when regulating energy provided to a load. Also, for purposes of this disclosure, "ground" or "ground potential" refers to a reference voltage or potential against which all other voltages or potentials of an electronic circuit or Integrated circuit (IC) are defined or measured.

Also in the context of the present application, power may be transferred via an energy transfer element (e.g., a transformer) from an input (e.g., from a primary) side to an output (e.g., to a secondary) side according to a switching cycle. For instance, a primary switch may switch according to a switching cycle whereby a winding (i.e., a primary winding) receives input power for part of the switching cycle and one or more secondary windings provide power for another part of the switching cycle. An energy transfer element may also be an energy storage element, as energy from an input source may be stored in the element during one part of a switching cycle, and the stored energy may be transferred to an output during another part of the switching cycle. A magnetic energy storage element may have only a single winding, as energy from a circuit may be stored in the element during one part of a switching cycle, and the stored energy may be removed from the element during another part of a switching cycle, not necessarily transferred to an output.

As mentioned above, switching power supplies may use magnetic circuits to transfer energy. Magnetic circuits, in turn, may channel magnetic fields and/or magnetic flux in a magnetic energy storage element (e.g., a transformer or inductor). When the magnetic circuit includes a core (e.g., a ferromagnetic core), variations due to an applied magnetomotive force may give rise to vibration. For instance, a ferromagnetic core may, as a result of magnetostriction, mechanically deform (i.e., vibrate) in response to variations in magnetic flux. When the mechanical deformation varies over frequencies audible to the human ear (e.g., twenty hertz to twenty kilohertz), this may be perceived as unwanted acoustic noise. Accordingly, there is a need to reduce mechanical deformation of magnetic circuits within the audible frequency range.

Presented herein are methods and apparatus for biasing magnetic circuits to reduce audible noise from a switching power supply. A magnetic component (e.g., a magnet) is constructed and provided to a core (e.g., a ferromagnetic core) to offset (i.e., bias) an applied magnetomotive force. By selecting and/or manufacturing the magnetic component based on a circuit operating condition, the offset may be tailored to advantageously shift a frequency of mechanical deformation outside the audible range. In a switching power supply with fixed peak current, the offset to the applied magnetomotive force may be determined, at least in part, by the fixed peak.

Alternatively and additionally, a peak current of a switching power supply may be determined (e.g., fixed), at least in part, in accordance with an offset magnetomotive force to advantageously shift a frequency of mechanical deformation. For instance, a magnetic circuit may be configured to have an offset magnetomotive force; and a peak current of a switching power supply may then be fixed in accordance with the offset magnetomotive force such that the frequency of mechanical deformation is shifted outside of the audible range.

FIG. 1A illustrates a switching power supply 100 including a magnetic circuit 102 according to an embodiment. Additionally, the switching power supply 100 includes a primary switch S, a secondary diode D1, an output capacitor C1, a controller 110, and a load 130. The magnetic circuit 102 includes a primary coil 107, a secondary coil 109, a core 108, and a magnetic component 120. The core 108 includes a magnetic material having a magnetic permeability substantially greater than the permeability of free space. For instance, the permeability of the magnetic material in magnetic circuits for power conversion can be greater than 1000 times the permeability of free space. The configuration of the magnetic circuit 102 may be referred to as a gapped core configuration since it includes a gap (e.g. a section of the magnetic path occupied by a material of relatively low magnetic permeability) of dimension $L_G$; and as shown, the magnetic component 120 may be positioned within the gap of dimension $L_G$. The magnetic component 120 may have a magnetic permeability approximately equal to the magnetic permeability of air.

As illustrated, the primary coil 107 is wrapped around the core 108 between coil terminals 103, 104 and is electrically coupled with the primary switch S1 to a primary ground GND. Also, the secondary coil 109 is wrapped around the core 108 between coil terminals 105, 106; coil terminals 105 and 106 are electrically connected between an anode of secondary diode D1 and secondary ground RTN. Additionally, the load 130 and the output capacitor C1 are electrically connected in parallel between the secondary ground RTN and the cathode of secondary diode D1.

Also as illustrated, the switching power supply 100 is configured as a flyback converter to transfer energy and/or power (i.e., the rate of energy transfer) according to a switching cycle. The primary switch S1 can be gated (i.e., switched) according to the switching cycle with control signal $U_{DR}$. The gating of primary switch S1, in turn, provides switched input power, in the form of primary current $I_P$ and primary voltage $V_P$, to the primary coil 107. For instance, as illustrated in FIG. 1A, the primary current $I_P$ may have a periodic ramp waveform reaching a peak current $I_{LIM}$ over a period $T_S$.

According to the teachings herein, the peak current $I_{LIM}$ can be a fixed peak current which has a constant and/or substantially constant steady-state value (i.e., a fixed temporally unvarying value) depending upon operating conditions (e.g., a value of the load 130). For instance, under a first set of operating conditions, the peak current $I_{LIM}$ may be fixed to equal and/or substantially two amperes; while under a second set of operating conditions, the peak current $I_{LIM}$ may be fixed to equal and/or substantially equal two hundred milliamperes.

In response to the primary current $I_P$ and primary voltage $V_P$, the magnetic circuit 102 (e.g., transformer) may transfer energy between the coil terminals 103, 104 to coil terminals 105, 106. In transferring energy, the core 108 may couple magnetic energy from the primary coil 107 to the secondary coil 109 via a total magnetic flux density B. The total magnetic flux density B can be given by the sum of an applied flux density $B_A$ and an offset flux density $B_{OFS}$. As illustrated, offset flux density $B_{OFS}$ may be directed opposite to the applied flux density $B_A$.

Additionally, the applied flux density $B_A$ may be generated in response to primary current $I_P$ and the offset flux density $B_{OFS}$ may be generated in response to the magnetic component 120. The secondary coil 109 may provide a time varying secondary current $I_S$, also with period $T_S$. Also, the diode D1 and output capacitor C1 may operate to provide rectified output current $I_O$ and output voltage $V_O$ to the load 130.

Power (e.g., output voltage $V_O$ with rectified output current $I_O$) may be controlled, in part, with the controller 110. The controller 110 may receive a feedback signal FB proportional to the output voltage $V_O$ and/or a current sense signal $I_{EN}$ proportional to the primary current $I_P$. In response, the controller 110 may provide control signal $U_{DR}$ to regulate the primary current $I_P$. For instance, the controller may regulate and/or limit the peak current $I_{LIM}$.

In many applications using switching power supplies (e.g., power supplies that use a flyback converter), an operating condition may be estimated and/or determined in advance. For instance, in applications using a switching power supply specified to operate at constant, or substantially constant, switching frequency, the peak current $I_{LIM}$ may be experimentally determined and/or calculated in advance. According to the teachings herein, audible noise from the magnetic circuit 102 may advantageously be reduced by constructing the magnetic component 120 based on the determined operating condition. Alternatively and additionally, audible noise from a given magnetic circuit 102 may advantageously be reduced by constructing the power supply circuit according to the characteristics of the given magnetic circuit 102.

Further, although the switching power supply 100 is configured with magnetic circuit 102 as a flyback converter, other configurations are possible. For instance, a magnetic circuit 102 may be used in a switching power supply using greater or fewer coils (i.e., greater or fewer than primary and secondary coils 107, 109). In other applications a magnetic circuit 102 may be used in a multi-output converter having multiple secondary coils and/or in a switching power supply configured as a resonant converter.

Figure 1B:
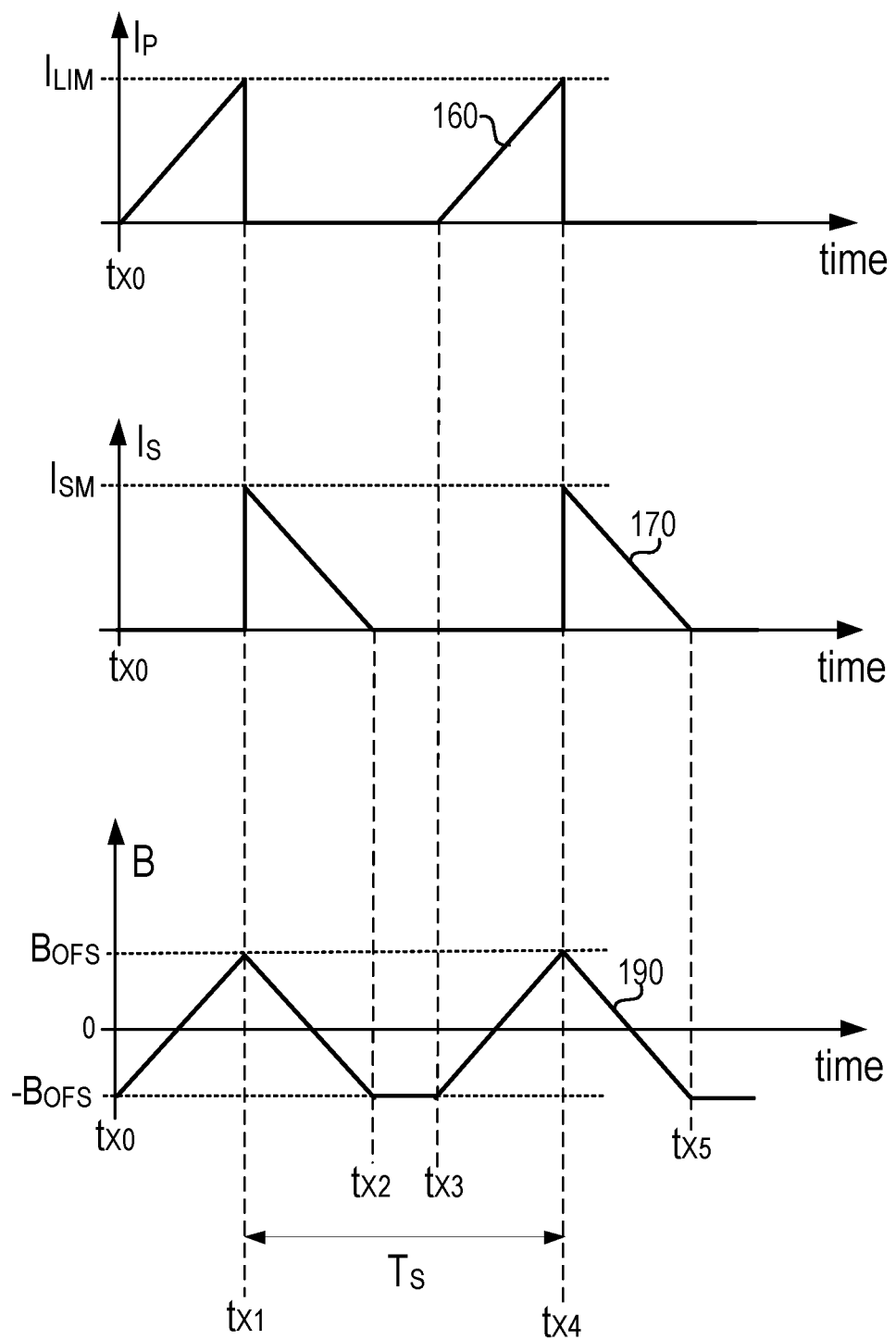
FIG. 1B illustrates waveforms of the magnetic circuit of FIG. 1A according to the teachings herein.

FIG. 1B illustrates waveforms 160, 170, and 190 of the magnetic circuit of FIG. 1A according to the teachings herein. Waveforms 160, 170, and 190 may correspond respectively to the primary current $I_P$, the secondary current $I_S$, and the total magnetic flux density B periodic with a switching cycle of period $T_S$. As shown by waveform 160, the primary current $I_P$ may ramp with positive slope while the primary switch S1 is closed. The primary current $I_P$ may ramp (i.e., increase) from zero or substantially zero current to a peak current $I_{LIM}$ between times tx0 to tx1 and times tx3 to tx4.

Similarly, waveform 170 of secondary current $I_S$ is also triangular with periodic downward ramps; and the peak current $I_{SM}$ may be related to peak current $I_{LIM}$ by a turns ratio of the primary and secondary coils 107, 109. Also, the downward ramps of waveform 170 occur between times tx1 to tx2 and times tx4 to tx5 with period $T_S$ and may correspond with the opening of primary switch S1.

According to the teachings herein, having advance knowledge of periodic waveform 160 (i.e., the primary current $I_P$) and/or waveform 170 (i.e., the secondary current $I_S$) may advantageously provide guidance for the selection and/or construction of magnetic component 120. For instance, one or more dimensions of the magnetic component 120 may be selected to provide an offset magnetic flux density $B_{OFS}$.

The offset magnetic flux density $B_{OFS}$ may bias (i.e., offset) the applied magnetic flux density $B_A$ so that the total magnetic flux density B in the core 108 varies with both negative and positive values. For instance, as shown by waveform 190, the total magnetic flux density B is biased (i.e., offset) to transition symmetrically between a positive peak (i.e., $B_{OFS}$) and a negative peak (i.e., negative (−) $B_{OFS}$). As described herein, having both negative and positive values may advantageously avail vibrational frequencies (i.e., acoustic frequencies) which are shifted relative to the frequency of waveforms 160, 170, and 190. The vibrational frequencies may be shifted to be outside the audible noise range.

Figure 2A:
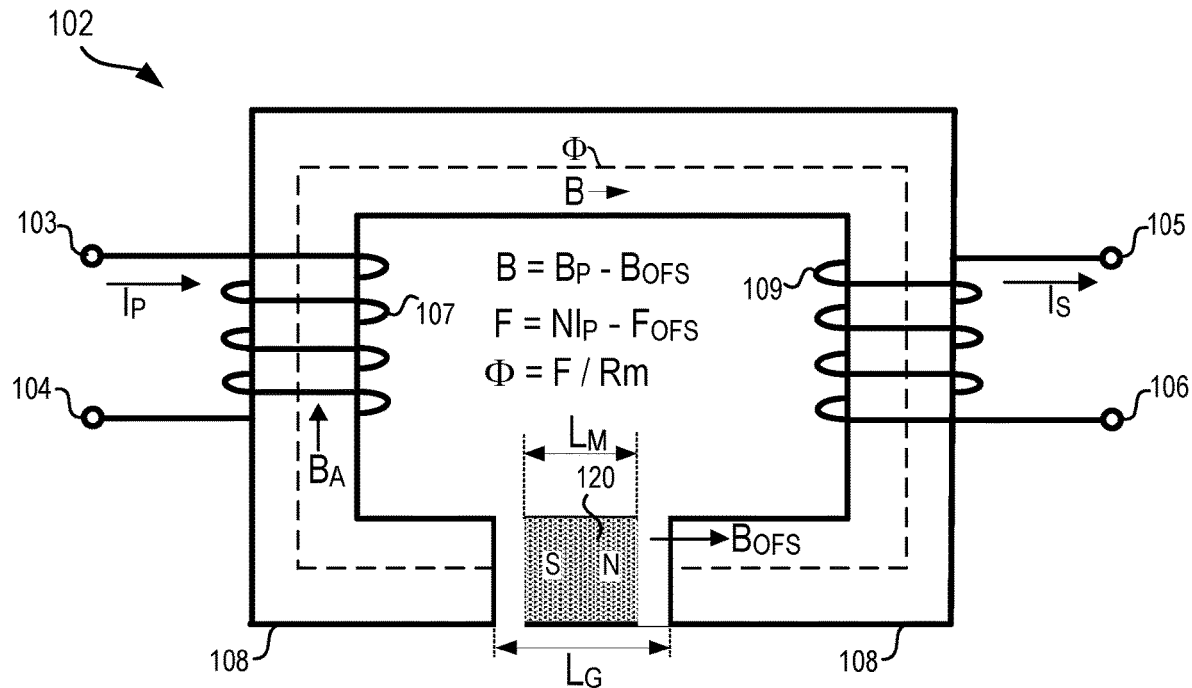
FIG. 2A illustrates a magnetic circuit according to a first embodiment.

FIG. 2A illustrates a magnetic circuit 102 according to a first embodiment. The magnetic circuit 102 is similar to magnetic circuit 102 of FIG. 1A and shows magnetic circuit relationships for total magnetic flux density B, total magnetomotive force F, and total magnetic flux Φ. The total magnetic flux Φ in the magnetic circuit 102 may be analogous to current from the source of power in an electric circuit and measured in units of webers. The value of total magnetic flux Φ may also be related to an integration of the total magnetic flux density B, a vector quantity having units of tesla; and the integration may be performed over a perpendicular area, perpendicular to the total magnetic flux density B.

Also, the total magnetomotive force F in a magnetic circuit may be analogous to voltage in an electric circuit. For instance, voltage in an electrical circuit can produce current in proportion to resistance whereas total magnetomotive force F can produce total magnetic flux Φ in proportion to total reluctance Rm. Total reluctance Rm may depend on physical dimensions and/or a magnetic permeability of the magnetic circuit; and the total magnetomotive force F may be measured in units of ampere-turns. Additionally, total magnetomotive force F may be provided from an electromagnet (e.g., a coil carrying a current) and/or from a pole of a permanent magnet.

In magnetic circuit 102, the magnitude of the total magnetic flux density B drawn in the clockwise direction of the circuit may be expressed by $$B = B_A - B_{OFS} \qquad \text{EQ. 1}$$

in terms of the applied magnetic flux density $B_A$ and the offset magnetic flux density $B_{OFS}$. As indicated by equation EQ. 1, the total magnetic flux density B may be given by the difference of the applied magnetic flux density $B_A$ and the offset magnetic flux density $B_{OFS}$ when the offset magnetic flux density $B_{OFS}$ is directed opposite to the applied magnetic flux density $B_A$. According to electromagnetic theory, the total magnetic flux Φ, shown by the dashed line in FIG. 2A, may be expressed as a vector surface integral (i.e., a dot product surface integral) of the total magnetic flux density B over cross sectional area $d\vec{A}$. Thus, the total magnetic flux Φ can be proportional to the total magnetic flux density B according to $$\Phi = \int \vec{B} \cdot d\vec{A} \qquad \text{EQ. 2}$$

where the total magnetic flux Φ may be expressed in units of webers.

According to magnetic circuit theory, the primary current $I_P$ in primary coil 107 may induce an applied magnetomotive force $F_A$ given by $$F_A = N I_P \qquad \text{EQ. 3}$$

in units of ampere-turns, where turns number N is the number of turns (i.e., number of wraps) of primary coil 107 around core 108. With reference to magnetic circuit 108 the total magnetomotive force F may be expressed by $$F = F_A + F_{OFS} = NI_P + F_{OFS} \qquad \text{EQ. 4}$$

whereby the offset magnetomotive force $F_{OFS}$ can be due to the magnetic component 120 and can comprise negative values. Also according to magnetic circuit theory, the total magnetic flux $\Phi$ may be approximated by $$\Phi = F/Rm \qquad \text{EQ. 5}$$

where total reluctance Rm may be expressed in units of ampere-turns per weber. Also, total reluctance Rm may relate to and/or include reluctances of the core 108 and of the gap of dimension $L_G$.

Figure 2B:
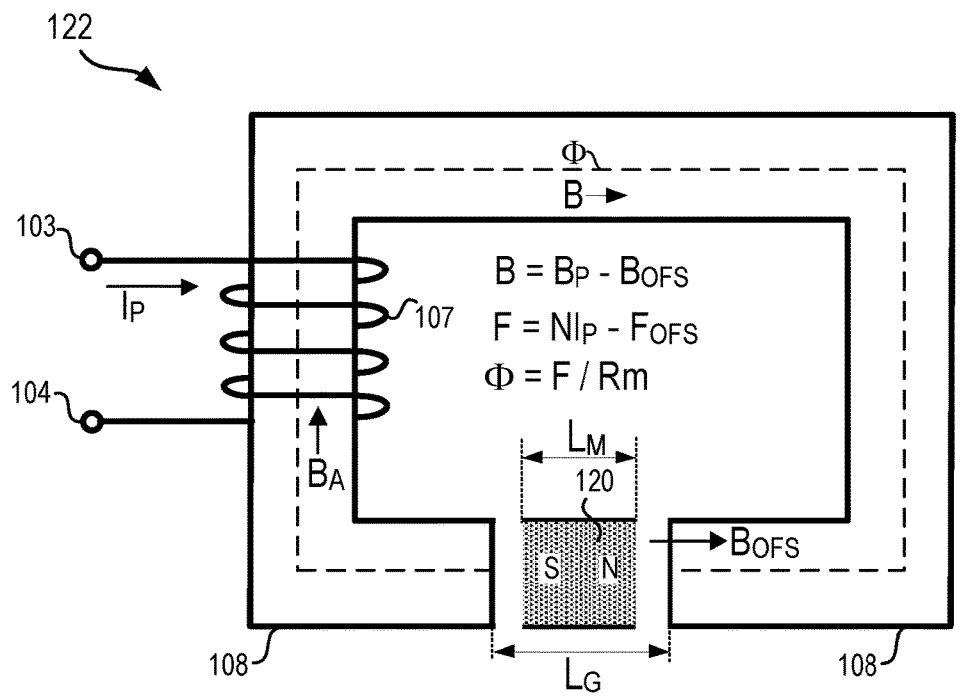
FIG. 2B illustrates a magnetic circuit according to a second embodiment.

FIG. 2B illustrates a magnetic circuit 122 according to a second embodiment. Magnetic circuit 122 is similar to magnetic circuit 102 except it does not include the secondary coil 109. For instance, magnetic circuit 122 may correspond to an inductive component (e.g., an inductor) for use in a switching power supply such as a buck and/or a boost converter; and the relations given by equations EQ. 1-EQ. 5 above may again apply with regards to providing the magnetic component 120 to create an offset magnetic flux density $B_{OFS}$.

Figure 2C:
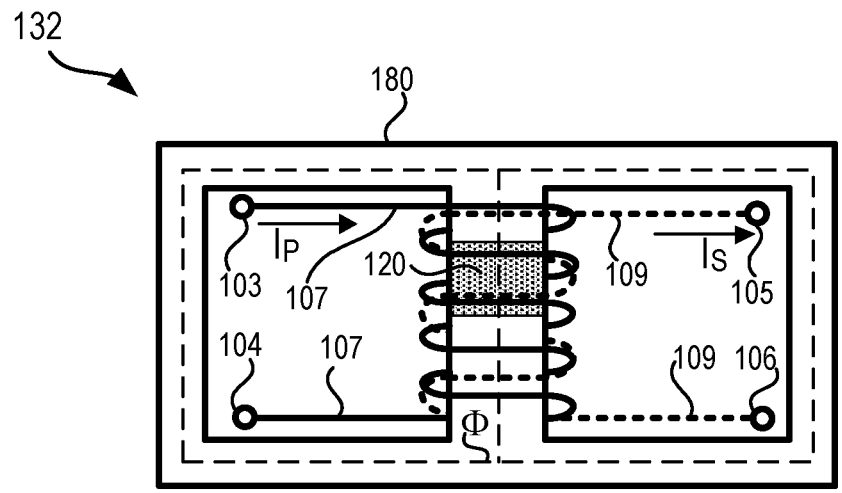
FIG. 2C illustrates a magnetic circuit according to a third embodiment.
Figure 2D:
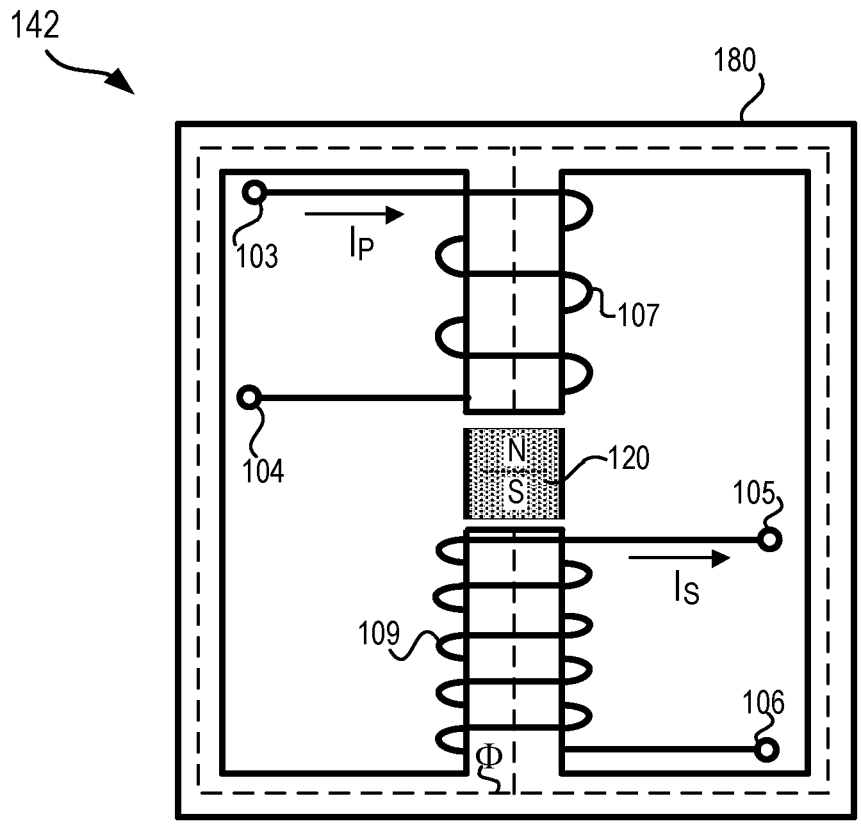
FIG. 2D illustrates a magnetic circuit according to a fourth embodiment.

FIG. 2C illustrates a magnetic circuit 132 according to a third embodiment; and FIG. 2D illustrates a magnetic circuit 142 according to a fourth embodiment. Magnetic circuit 132 and magnetic circuit 142 may be used in a switching power supply 100 and are similar to magnetic circuit 102, except magnetic circuit 132 and magnetic circuit 142 use a core 180. Core 180 may use a similar material (e.g., a ferromagnetic material) except, the primary and secondary coils 107, 109 are wound around a center leg of core 180 and around the magnetic component 120. In magnetic circuit 132 both the primary and secondary coils 107, 109 are wound together around the center leg of core 180 while in magnetic circuit 142 the primary coil 107 is wound above the secondary coil 109. Also, as illustrated, the magnetic component 120 may be positioned in a gap of core 180 to provide an offset magnetic flux density $B_{OFS}$.

Figure 3A:
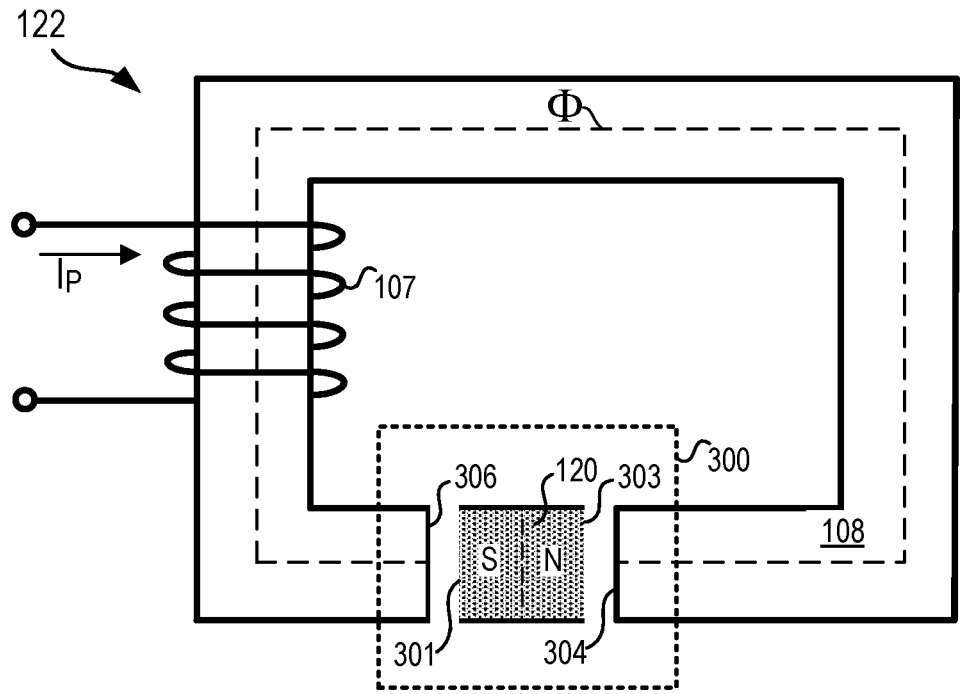
FIG. 3A illustrates a core region in a magnetic circuit according to an embodiment.
Figure 3B:
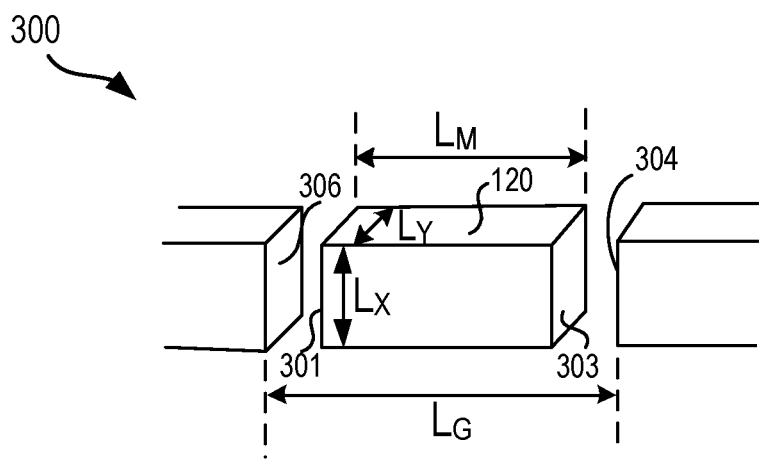
FIG. 3B illustrates a side perspective view of the core region of FIG. 3A.

FIG. 3A illustrates a core region 300 in magnetic circuit 122 according to an embodiment; and FIG. 3B illustrates a side perspective view of the core region 300. The core region 300 includes the magnetic component 120, magnetic component surfaces 301, 303, and core gap surfaces 304, 306. As shown in the side perspective view, the magnetic component 120 and core 108 may have polyhedron features. For instance, the magnetic component 120 may be a cuboid with dimensions Lx, Ly, and $L_M$; and the core 108 may have a gap of dimension $L_G$ separating the core gap surfaces 304, 306. In some embodiments magnetic component 120 may comprise a magnetized ferromagnetic material, a ferrite, lodestone, and/or a composite ceramic material suitable for providing the offset magnetic flux density $B_{OFS}$.

The offset magnetic flux density $B_{OFS}$ may be a function of the cuboid dimensions Lx, Ly, and $L_M$, whereby the offset magnetic flux density $B_{OFS}$ can be selected by adjusting one or more of the dimensions Lx, Ly, and $L_M$. As one of ordinary skill in the art may appreciate, offset magnetic flux density $B_{OFS}$ may be measured by using direct and/or indirect measuring techniques. For instance, the offset magnetic flux density $B_{OFS}$ may be determined directly by using a fluxmeter. Additionally, the offset magnetic flux density $B_{OFS}$ may be determined indirectly from electrical measurements of the positive and negative voltage excitations required to saturate the core.

In some embodiments the magnetic component 120 may be positioned within the gap of dimension $L_G$ with additional materials to secure the magnetic component 120 within the core 108. In other embodiments the dimensions $L_G$ and $L_M$ may be selected to be approximately and/or substantially equal such that the magnetic component 120 is secured by contact friction.

Additionally, although the magnetic component 120 and the core 108 are shown to have polyhedron features, other shapes are possible. For instance, the core gap surfaces 304, 306 may have circular perimeters and the magnetic component 120 may be cylindrical with an adjustable dimension $L_M$. Alternatively, and additionally, a magnetic component 120 can be created using other configurations. For instance, the magnetic component 120 may be replaced with an electromagnet.

Figure 4A:
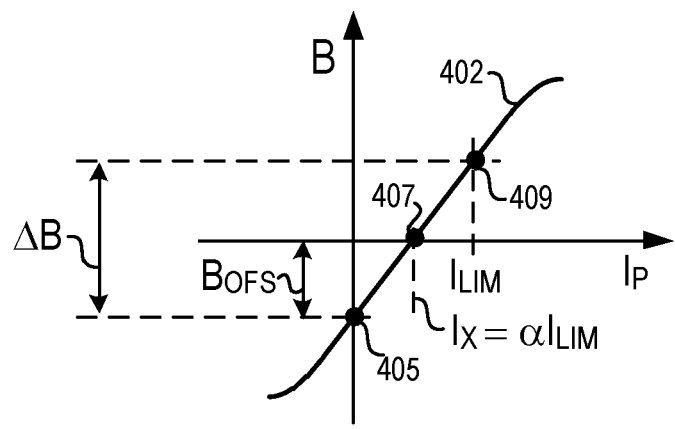
FIG. 4A illustrates a characteristic curve of total magnetic flux density as a function of primary current according to an embodiment.
Figure 4B:
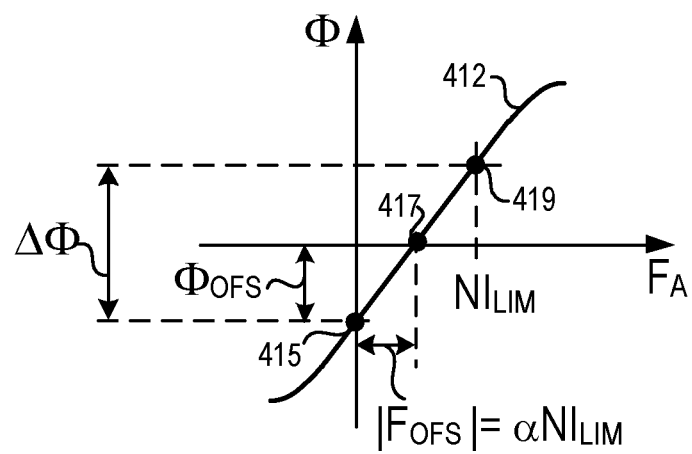
FIG. 4B illustrates a characteristic curve of the total magnetic flux as a function of the applied magnetomotive force according to the embodiment of FIG. 4A.

FIG. 4A illustrates a characteristic curve 402 of total magnetic flux density B as a function of primary current $I_P$ according to an embodiment; and FIG. 4B illustrates a characteristic curve 412 of the total magnetic flux $\Phi$ as a function of the applied magnetomotive force $F_A$ according to the embodiment of FIG. 4A. In the context of a magnetic circuit (e.g., magnetic circuit 102, 122, 132, and/or 142), the characteristic curve 402 can be dependent upon material properties (e.g., total reluctance Rm) of the core (e.g., core 108 and/or core 180). The peak current $I_{LIM}$ can be a value which is determined by an operating condition. For instance, with reference to FIG. 1A and FIG. 1B, the peak current $I_{LIM}$ can be determined by a specification and/or measurement of the waveform 160. Alternatively, the peak current $I_{LIM}$ may be determined, at least in part, from the peak current $I_{SM}$ of waveform 170 and a turns ratio of the primary coil 107 and secondary coil 109.

According to the teachings herein, the offset magnetic flux density $B_{OFS}$ can be selected to provide bias in the core (e.g., core 108 and/or core 180) so that the characteristic curve 402 avails operation of the magnetic circuit (i.e., magnetic circuit 102, 192, and/or 122) to transition between points 405 and 409. Point 405 may correspond to when the primary current $I_P$ is zero and to where the total magnetic flux density B equals and/or substantially equals the negative magnitude of the offset magnetic flux density $B_{OFS}$. Point 409 may correspond to when the primary current $I_P$ reaches the peak current $I_{LIM}$, and to where the total magnetic flux density B transitions by a differential magnetic flux density ΔB relative to point 405. Point 407 may correspond to where the total magnetic flux density B approaches zero and to where the primary current $I_P$ approaches a zero-flux current Ix.

The zero-flux current Ix may be proportional to the peak current $I_{LIM}$ by $$Ix = \alpha I_{LIM} \qquad \text{EQ. 6}$$

where the scale factor $\alpha$ can be determined in relation to the offset magnetic flux density $B_{OFS}$. For instance, the offset magnetic flux density $B_{OFS}$ may be selected by adjusting a dimension (e.g., dimension $L_M$) of the magnetic component 120 such that the scale factor $\alpha$ is equal to and/or substantially equal to one half. When the scale factor $\alpha$ equals one half, then the characteristic curve 402 may have symmetry (i.e., a symmetry condition) whereby the magnitude of the total magnetic flux density B at point 405 equals and/or substantially equals the magnitude of the total magnetic flux density B at point 409.

As shown in FIG. 4B, characteristic curve 412 relates the total magnetic flux $\Phi$ to the applied magnetomotive force $F_A$. According to equation EQ. 3, the applied magnetomotive force $F_A$ may be related to the primary current $I_P$ by the turns number N; accordingly, the applied magnetomotive force $F_A$ is scaled by the turns number N relative to the primary current $I_P$ of FIG. 4A. Also, as discussed with regards to equation EQ. 2, the total magnetic flux Φ may be proportional to the total magnetic flux density B.

Accordingly, the characteristic curve 412 may be proportional to the characteristic curve 402; and the selection and/or construction of magnetic component 120 may correspond to providing an offset magnetomotive force $F_{OFS}$ $$F_{OFS} = -NIx = -\alpha NI_{LIM}. \qquad \text{EQ. 7}$$

Additionally, the peak applied magnetomotive force $F_{LIM}$ may be given by $$F_{LIM} = NI_{LIM}. \qquad \text{EQ. 8}$$

Thus, the magnetic component 120 can provide the offset magnetomotive force $F_{OFS}$ in proportion to the peak applied magnetomotive force $F_{LIM}$ according to $$F_{OFS} = -\alpha F_{LIM}. \qquad \text{EQ. 9}$$

According to the teachings herein, the offset magnetic flux density $B_{OFS}$ can be selected so that the magnetic circuit (i.e., magnetic circuit 102, 192, and/or 122) operates according to the characteristic curve 412 between points 415 and 419. Point 415 may correspond to when the primary current $I_P$ is zero and to where the total magnetic flux Φ equals and/or substantially equals the negative magnitude of an offset magnetic flux $Φ_{FS}$. Point 419 may correspond to when the applied magnetomotive force $F_A$ reaches the peak applied magnetomotive force $F_{LIM}$ (see e.g., equation EQ. 8) and to where the total magnetic flux Φ reaches a differential magnetic flux ΔΦ relative to point 415. Additionally, point 417 may correspond to when the total magnetic flux Φ and the total magnetomotive force F become zero.

According to an embodiment of a magnetic circuit (e.g., magnetic circuit 102, 122, 132, and/or 142), when the scale factor α equals and/or substantially equals one half, then the total magnetic flux Φ may vary symmetrically between points 415 and 419. For instance, as illustrated by characteristic curve 412, when the scale factor α equals one half, then the magnitude of the total magnetic flux Φ at point 419 may equal the magnitude of the total magnetic flux Φ at point 415. The symmetry condition, whereby the scale factor equals and/or substantially equals one half, may also correspond with a condition whereby the offset magnetomotive force $F_{OFS}$ is equal and/or substantially equal to one half of an additive inverse of the peak applied magnetomotive force $F_{LIM}$.

Figure 5A:
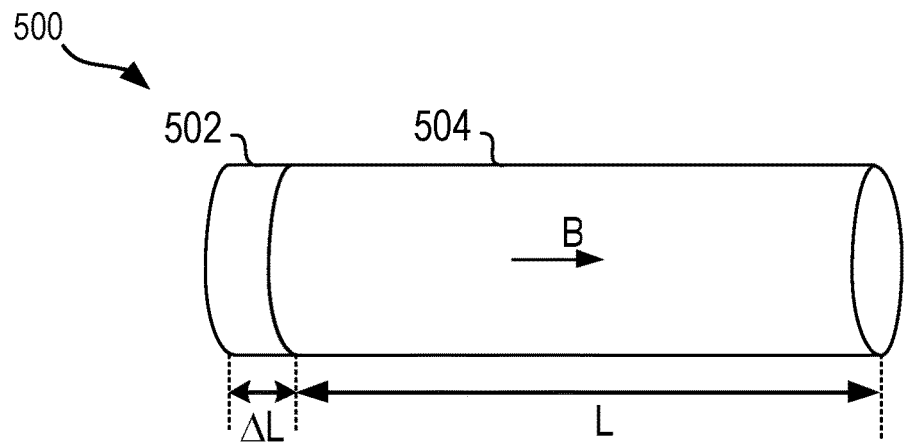
FIG. 5A illustrates mechanical variation due to a total magnetic flux density in a ferromagnetic material.
Figure 5B:
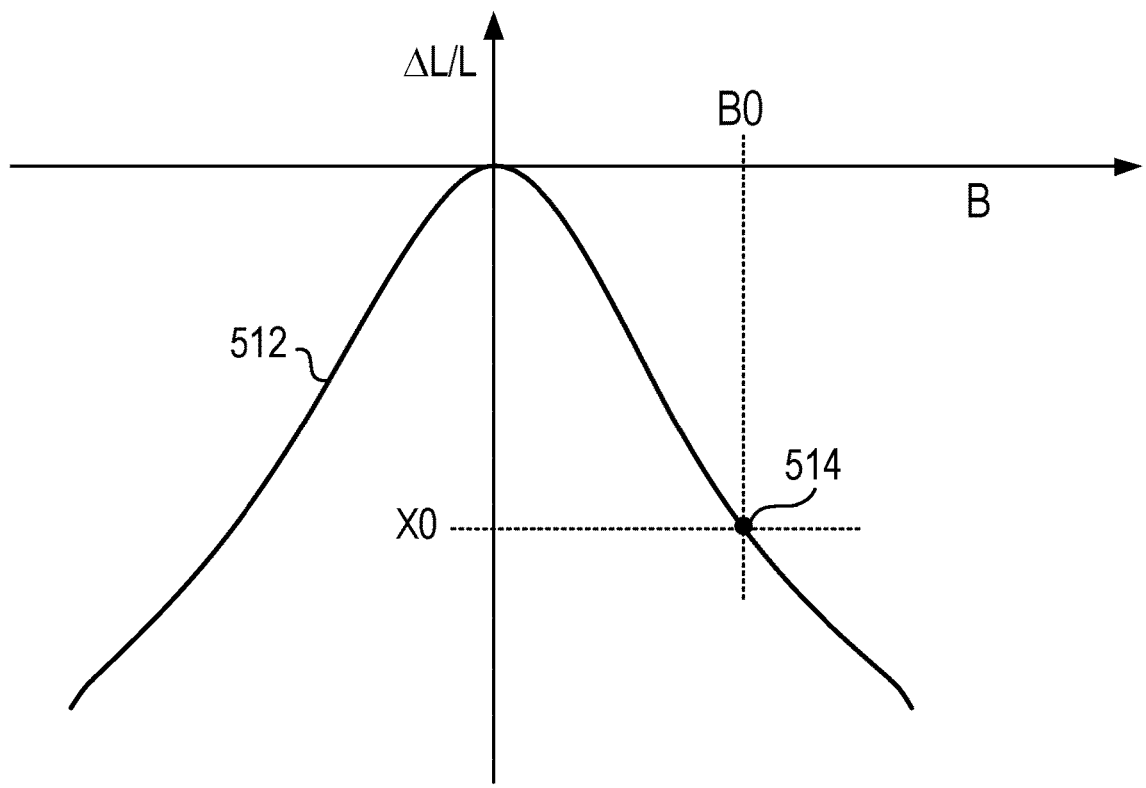
FIG. 5B illustrates a characteristic curve of strain versus total magnetic flux density in the ferromagnetic material of FIG. 5A.

FIG. 5A illustrates mechanical variation due to a total magnetic flux density B in a ferromagnetic material 500; and FIG. 5B illustrates a characteristic curve 512 of strain versus total magnetic flux density B in the ferromagnetic material 500. The ferromagnetic material 500 can be a segment of a core (e.g., core 108 and/or core 180). For illustrative purposes, the ferromagnetic material 500 shows a region 504 of length L and a region 502 of differential length ΔL. Strain may be defined as a ratio of the differential length ΔL to the length L. When the length L increases in response to a stimulus, the differential length ΔL can be positive and the strain can have a positive value referred to as "positive strain". Conversely, when the length L decreases in response to a stimulus, the differential length ΔL can be negative and the strain can have a negative value referred to as "negative strain". Accordingly, the characteristic curve 512 shows negative strain indicating that the length L reduces with increasing total magnetic flux density B.

According to the concept of magnetostriction, when a total magnetic flux density B is applied, the ferromagnetic material 500 expands and/or contracts (i.e., undergoes mechanical deformation and vibration) in proportion to the total magnetic flux density B. Accordingly, the magnetostriction properties of ferromagnetic material 500 may be characterized by characteristic curve 512 showing strain (i.e., ΔL/L) as a function of the total magnetic flux density B. For instance, point 514 shows the strain has a value X0 when the total magnetic flux density B has a value B0. Also, as discussed above, the total magnetic flux Φ can be related to the total magnetic flux density B; therefore, it may also be possible to express strain (i.e., ΔL/L) as a function of the total magnetic flux Φ.

Figure 6A:
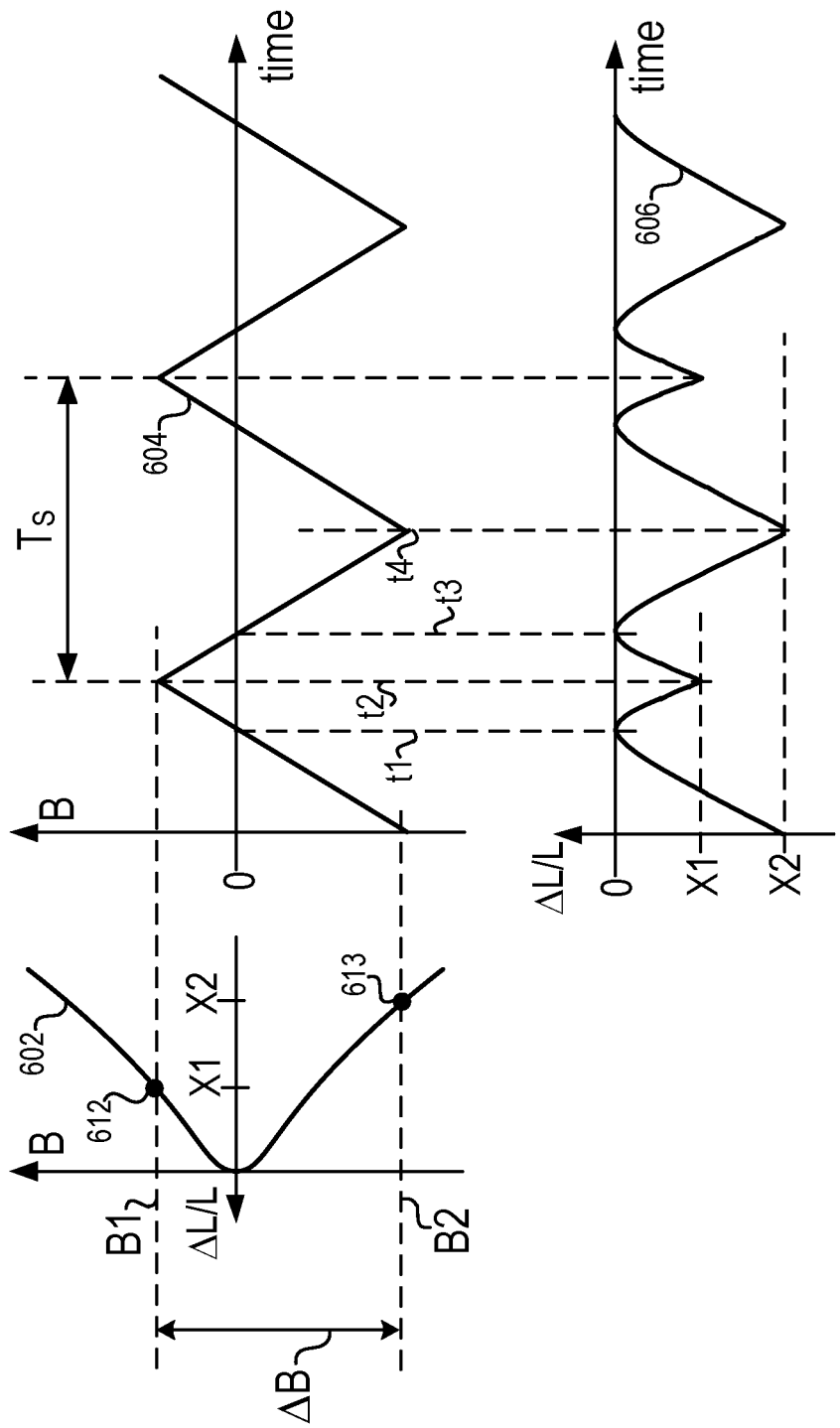
FIG. 6A illustrates waveforms of a magnetic circuit according to an embodiment.

FIG. 6A illustrates waveforms 604 and 606 of a magnetic circuit (e.g., magnetic circuit 102, 122, 132, and/or 142) according to an embodiment. Waveforms 604 and 606 are mapped from a characteristic curve 602 of strain versus total magnetic flux density B. Characteristic curve 602 may be similar to characteristic curve 512 showing strain due to magnetostriction. The point 612 may correspond to a strain of value X1 when the total magnetic field B has a value B1; and the point 613 may correspond to a strain of value X2 when the total magnetic field B has a value B2. The values B1, B2 may relate to an operating condition. For instance, the value B1 may be a maximum positive value of the total magnetic flux density B and the value B2 may be a maximum negative value of the total magnetic flux density B. With reference to FIG. 4A, the value B1 may be the value of the total magnetic flux density B at point 409 (i.e., when primary current $I_P$ reaches its peak current $I_{LIM}$); and the value B2 may be the value of the total magnetic flux density B at point 405 (i.e., when the primary current $I_P$ reaches zero). Accordingly, the total magnetic flux density B may vary over a range between point 612 and point 613 (i.e., between value B1 and value B2); and by inspection, the range can be the differential magnetic flux density ΔB.

Waveform 604, like waveform 190, is a waveform of the total magnetic flux density B; however, waveform 604 may correspond to a magnetic circuit in a power converter operating in continuous conduction mode, whereas the waveform 190 may correspond to a magnetic circuit in a power converter operating in discontinuous conduction mode. Waveform 606 may correspond with strain (i.e., ΔL/L) induced by the total magnetic flux density B due to magnetostriction. Also as illustrated, waveform 604 can be non-symmetrical (i.e., the magnitude of value B1 does not equal the magnitude of value B2) and is periodic with period $T_S$.

According to the mapping from characteristic curve 602, waveform 606 of the strain (i.e., ΔL/L) may have an irregular pattern with double extrema at times t1 and t3. At time t2 waveform 606 dips to a first minimum of value X1 and at time t4 dips to a deeper minimum of value X2. Similar to waveform 604, waveform 606 can be periodic with period $T_S$.

According to the teachings herein, the frequency of the strain (i.e., ΔL/L) may be shifted by selecting and/or constructing the magnetic component 120 so that a waveform of the total magnetic flux density B becomes symmetrical and/or substantially symmetrical. A symmetry condition can exist when the maximum positive value and the maximum negative value of the total magnetic flux density B have equal and/or substantially equal magnitudes. According to equation EQ. 1, the waveform of the total magnetic flux density B may become symmetrical under the condition that the total offset magnetic flux density $B_{OFF}$ subtracts from and equals to one half of the maximum applied magnetic flux density $B_A$.

According to magnetic circuit theory and equation EQ. 9, the above condition (i.e., symmetry condition) may also be satisfied when the scale factor α is equal to or substantially equal to one half. For instance, when the scale factor α equals one half, the offset magnetomotive force $F_{OFS}$ subtracts from and equals to one half a peak applied magnetomotive force $F_{LIM}$. According to mathematics, the concept of "subtracts from and equals to" can also be stated as "equal to an additive inverse of".

Accordingly, the symmetry condition may correspond to a condition whereby the offset magnetomotive force $F_{OFS}$ equals and/or substantially equals one half of an additive inverse of the peak applied magnetomotive force $F_{LIM}$.

Figure 6B:
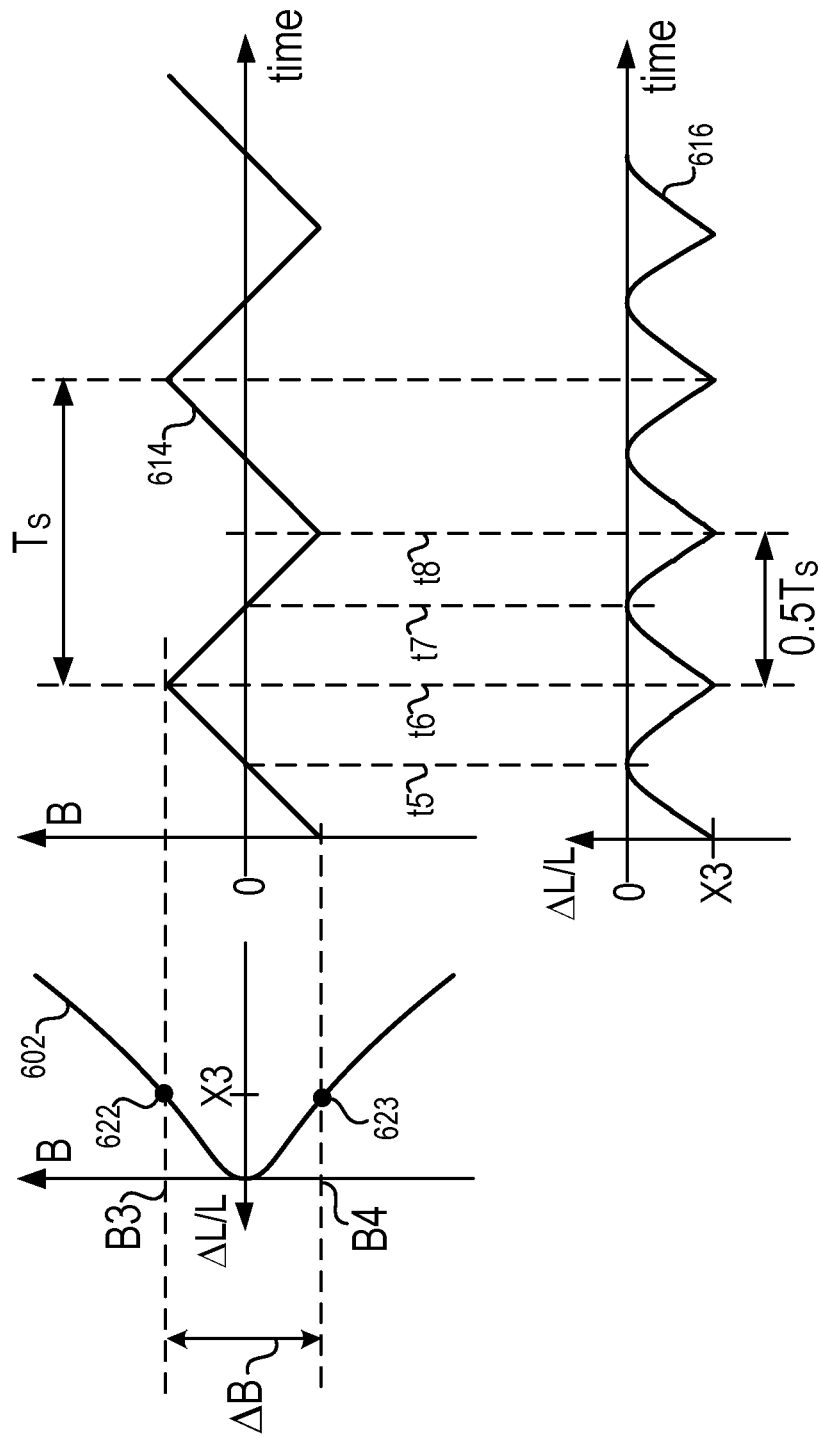
FIG. 6B illustrates waveforms of a magnetic circuit according to another embodiment.

FIG. 6B illustrates waveforms 614 and 616 of a magnetic circuit (e.g., magnetic circuit 102, 122, 132, and/or 142) according to an embodiment. Waveforms 614 and 616, like waveforms 604 and 606, are waveforms of total magnetic flux density B and strain (i.e., ΔL/L), respectively; and the embodiment may correspond with the above symmetry condition. As shown, waveforms 614 and 616 are mapped from characteristic curve 602 of strain versus total magnetic flux density B between symmetrical points 622 and 623. For instance, point 622 may correspond to a strain of value X3 when the total magnetic flux density B has a value B3; and the point 623 may correspond to a strain of value X3 when the total magnetic field B has a value B4.

Additionally, the magnitude of value B3 may be equal to and/or substantially equal to the magnitude of value B4. With reference to FIG. 4A, the value B3 may be the value of the total magnetic flux density B at point 409; and the value B4 may be the value of the total magnetic flux density B at point 405. The total magnetic flux density B may vary between point 622 and point 623 (i.e., between value B3 and value B4).

According to the mapping from characteristic curve 602, waveform 614 can have symmetry. For instance, the magnitude of value B3 at time t6 may equal or substantially equal the magnitude of value B4 at time t8. Consequently, waveform 616 may have a periodic waveform reaching zero at times t5, t7 and reaching the value X3 at times t6, t8. Additionally, the period of waveform 616 can be less than the period of waveform 614. For instance, the period of waveform 616 can be one half the period of waveform 614 (e.g., 0.5 $T_S$). Accordingly, the frequency of waveform 616 may be greater than the frequency of waveform 614 (e.g., twice the frequency of waveform 614).

According to the teachings herein the frequency of waveform 616 may be increased above that of waveform 614 to be shifted outside an audible range (e.g., 20 hertz to 20 kilohertz).

Figure 7:
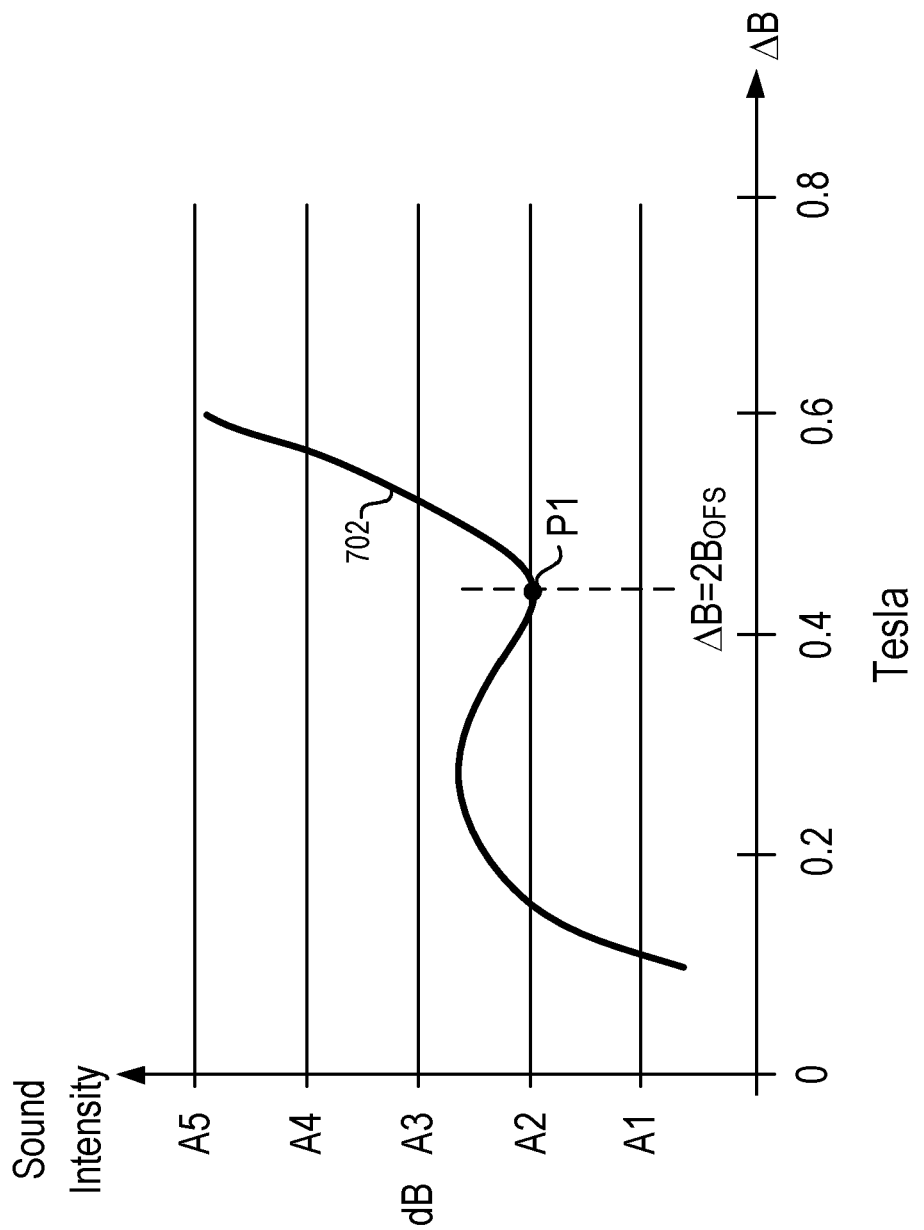
FIG. 7 illustrates sound intensity according to an embodiment.

FIG. 7 illustrates sound intensity 702 according to an embodiment. Sound that is undesirable is considered noise. The sound intensity 702 is a pressure that can be measured in decibels (dB) relative to a reference pressure (e.g., twenty micropascals that is the established threshold of human hearing) plotted as a function of the differential magnetic flux density AB. The differential magnetic flux density AB is provided in units of tesla (i.e., units of webers per meter squared). The sound intensity 702 can be experimentally measured and/or analytically predicted for a magnetic circuit (e.g., magnetic circuit 102, 122, 132, and/or 142) with a magnetic component 120. A corresponding magnetic component 120 may provide an offset magnetic flux density $B_{OFS}$ of approximately 0.22 tesla. Additionally the sound intensity 702 can correspond to experimental and/or analytical calculations over a range of frequencies including twenty kilohertz and below. As illustrated, the sound intensity 702 reaches a relative minimum intensity A2 at point P1 where the differential magnetic flux density AB is 0.44 tesla, twice the value of the offset magnetic flux density $B_{OFS}$ (i.e., 0.22 tesla). Advantageously, the audible noise associated with the sound intensity 702 can be reduced at point P1 by the offset magnetic flux density $B_{OFS}$ (i.e., by the magnetic component 120).

Figure 8:
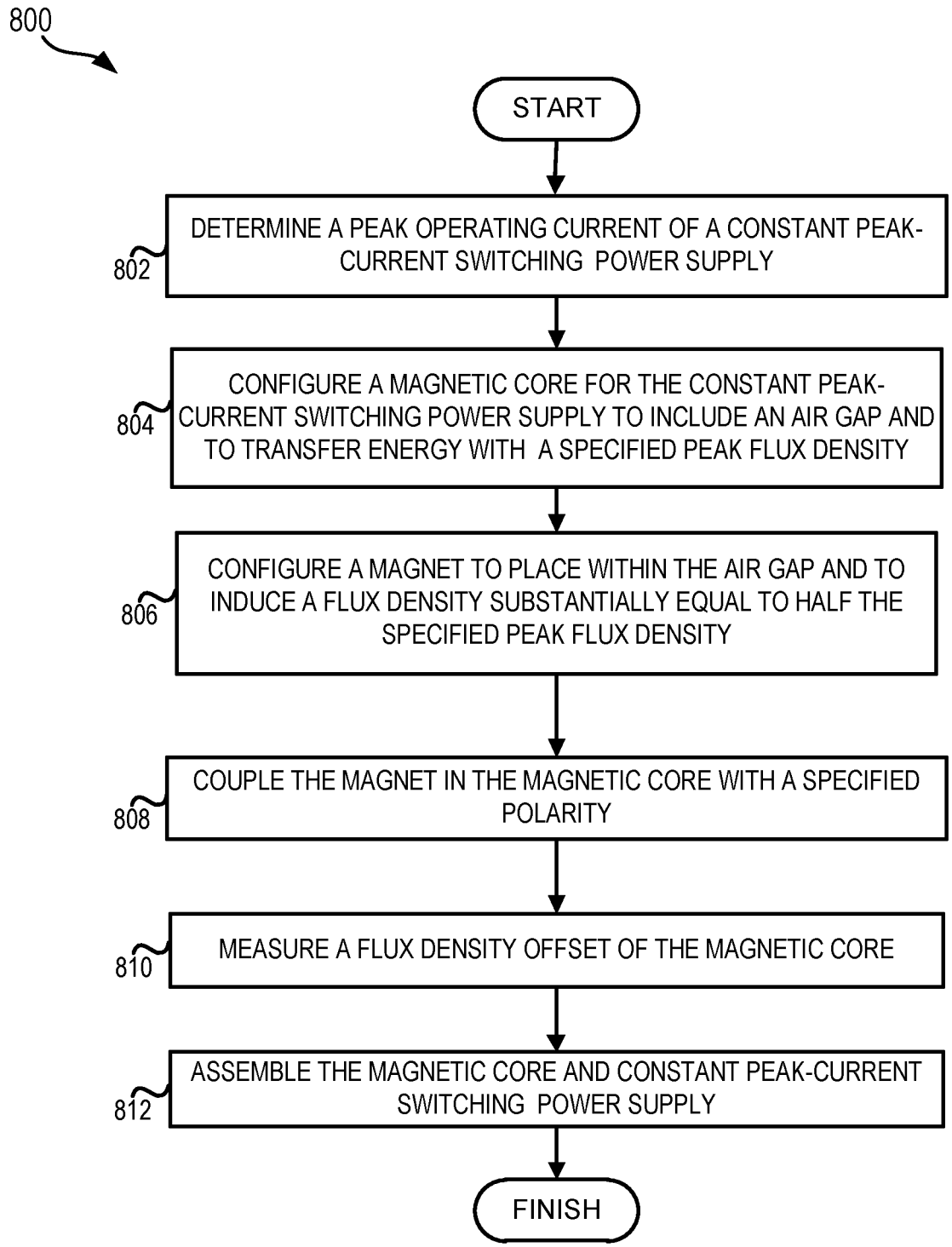
FIG. 8 illustrates a conceptual flow diagram for manufacturing a magnetic circuit according to the teachings herein.

FIG. 8 illustrates a conceptual flow diagram 800 for implementing a magnetic circuit (e.g., magnetic circuit 102, 122, 132, and/or 142) according to the teachings herein. Step 802 may correspond with selecting a peak-current switching power supply (e.g., switching power supply 100) that is configured to operate with a constant peak current $I_{LIM}$. Step 802 may be a design step for selecting and/or determining a specified (i.e., desired) operating condition; and the specified operating condition may include the peak current $I_{LIM}$. For instance, the peak current $I_{LIM}$ may be determined to be two amperes at an operating frequency (i.e., switching frequency) of ten kilohertz. Additionally, according to the teachings herein, the peak current $I_{LIM}$ may be a fixed (i.e., having a constant value) peak current of a first winding (e.g., primary coil 107).

Step 804 may correspond with configuring a magnetic core (e.g., core 108) for the constant peak-current power supply. Step 804 may additionally be a design step for designing the magnetic circuit (e.g., magnetic circuit 102) to include an air gap (e.g., the gap of dimension $L_G$) and to transfer energy (i.e., to operate as an energy transfer element). The magnetic circuit may be configured (i.e., designed) by adjusting dimensions of the air gap (e.g., the gap dimension $L_G$), adjusting dimensions of the core (e.g., core 108), and/or by selecting a number of wraps (e.g., turns number N) of the first winding (e.g., primary coil 107). In this way the magnetic circuit may be configured to operate with a specified (i.e., determined) peak flux density (i.e., a specified peak value of applied flux density $B_A$).

Step 806 can correspond to manufacturing, selecting, and/or providing a magnet (e.g., magnetic component 120). The magnet may be selected to fit within the air gap and to induce a flux density (e.g., offset flux density $B_{OFS}$) which has a value (i.e., magnitude) substantially equal to one half of the specified peak flux density (i.e., one half of the specified value of applied flux density $B_A$).

Step 808 may correspond with attaching and/or coupling the magnet with the core. The magnet may be placed within the core with a specified polarity (i.e., direction). According to the teachings herein, the polarity may be selected and/or specified so that the magnet provides an offset (i.e., offset magnetomotive force $F_{OFS}$) which is substantially equal to one half an additive inverse of the peak magnetomotive force (i.e., the peak applied magnetomotive force $F_{LIM}$). Also, as described above, selecting the offset magnetomotive force $F_{OFS}$ to be substantially equal to one half an additive inverse of the peak applied magnetomotive force $F_{LIM}$ may correspond with a symmetry condition.

The next steps 810 and 812 may correspond with confirmation and assembly steps, respectively. For instance, step 810 may correspond with measuring the flux density offset (i.e., offset flux density $B_{OFS}$) after the magnet has been placed within the air gap of the magnetic circuit (e.g., magnetic circuit 102); and step 812 may correspond with assembling the switching power supply (e.g., switching power supply 100). According to the teachings herein, the introduction of the magnet may then avail the symmetry condition whereby a maximum positive value and a maximum negative value of the total magnetic flux density B have substantially equal magnitudes; and as discussed above, the symmetry condition may advantageously reduce audible noise in core 108 by shifting a frequency of strain (i.e., ΔL/L) due to magnetostriction.

Figure 9:
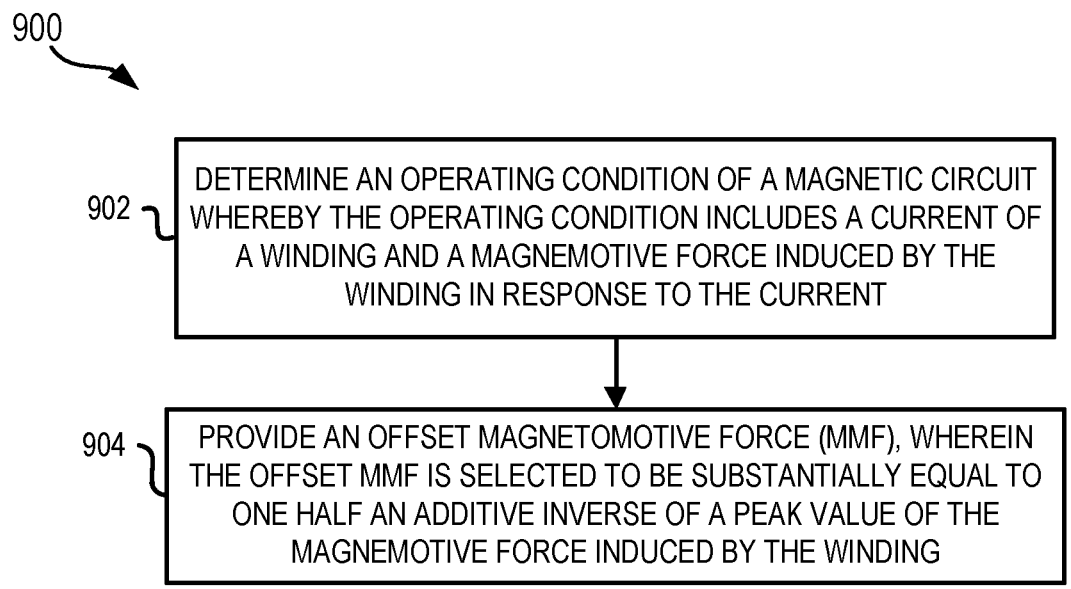
FIG. 9 illustrates a conceptual flow diagram for manufacturing a magnetic energy storage element according to the teachings herein.

FIG. 9 illustrates a conceptual flow diagram 900 for manufacturing a magnetic energy storage element (e.g., a transformer) according to the teachings herein. Step 902 may correspond to determining an operating condition of the magnetic energy storage element. The operating condition may include a current (e.g., a primary current $I_P$) of a winding (e.g., the primary coil 107). The operating condition may also include determining a magnetomotive force induced by the winding (e.g., the primary coil 107) in response to the current (i.e., determining an applied magnetomotive force $F_A$).

According to the teachings herein, the operating condition may include determining a peak applied magnetomotive force $F_{LIM}$. Step 904 may correspond to providing an offset magnetomotive force (e.g., offset magnetomotive force $F_{OFS}$). The offset magnetomotive force may be selected to be substantially equal to one half an additive inverse of a peak value of the magnetomotive force induced by the winding (e.g., the primary coil 107 and/or a primary winding). For instance, the offset magnetomotive force $F_{OFS}$ may be selected according to equation EQ. 9 with a scale factor α substantially equal to one half.

Figure 10:
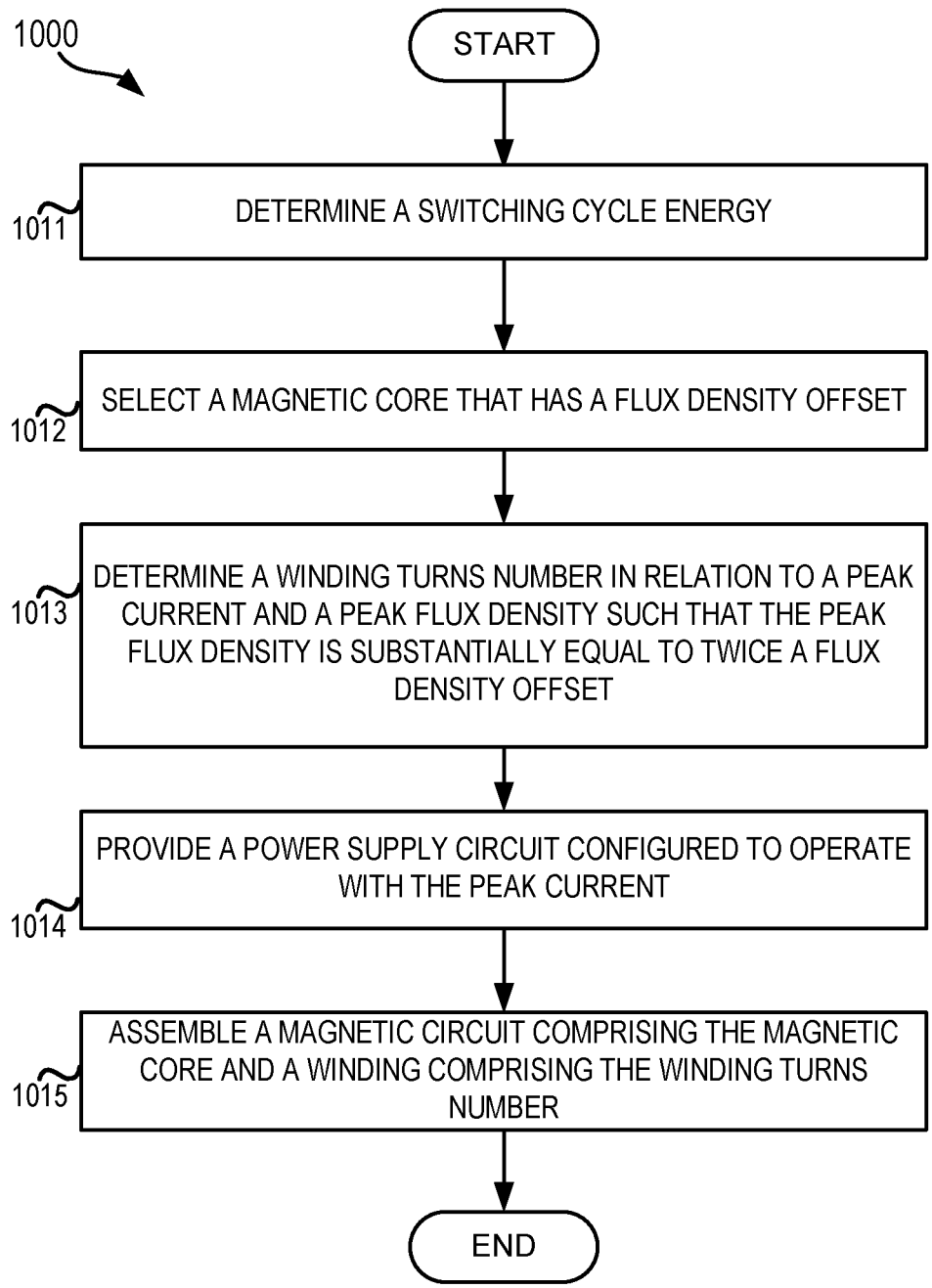
FIG. 10 illustrates a conceptual flow diagram for reducing audible noise in a switching power supply according to an embodiment.

FIG. 10 illustrates a conceptual flow diagram 1000 for reducing audible noise in a switching power supply 100 according to an embodiment. Step 1011 may correspond with determining a switching cycle energy. Switching cycle energy may be the amount of energy delivered to the load 130 during a switching cycle (e.g., during the period $T_S$ as shown in FIG. 1i). As one of ordinary skill in the art may appreciate, energy may be calculated and/or determined from power integrated over time. Accordingly, determining switching cycle energy may correspond with estimating and/or calculating a time integral of output power (e.g., power delivered to the load 130) over the period $T_S$.

Step 1012 may correspond with selecting a magnetic core (e.g., core 108). In some embodiments the magnetic core may be selected from a pre-fabricated (i.e., already available) set of magnetic cores. For instance, the magnetic core may be an off-the-shelf (OTS) magnetic core fabricated with a standard (i.e., pre-fabricated) gap (e.g., a gap of dimension $L_G$) and comprising a permanent magnet (e.g., magnetic component 120). The permanent magnet may impose a known (i.e., pre-determined) flux density offset (e.g., offset flux density $B_{OFS}$) within the OTS magnetic core. Additionally, an OTS magnetic core may also be tailored to avail the flux density offset (i.e., offset flux density $B_{OFS}$) such that the switching cycle energy is stored, at least in part, within the standard gap during a switching cycle of period $T_S$.

Step 1013 may correspond with determining a winding turns number (e.g., the number of wraps corresponding with turns number N). The winding turns number (i.e., turns number N) may depend, at least in part, upon a peak current (e.g., peak current $I_{LIM}$) of the switching cycle. Additionally, the winding turns number may be selected such that a peak flux density (e.g., a peak value of applied flux density $B_A$) is substantially equal to twice the flux density offset (i.e., offset flux density $B_{OFS}$); and the peak flux density (e.g., a peak value of applied flux density $B_A$) may be concurrent with the peak current (e.g., peak current $I_{LIM}$).

Step 1014 and 1015 may correspond with steps relating to constructing a switching power supply 100. For instance, step 1014 may correspond with providing a power supply circuit which may comprise elements and components of switching power supply 100 except without the magnetic circuit 102. The power supply circuit may be configured to operate with the peak current. For instance, the power supply circuit may be tailored, designed, manufactured, and/or constructed with components and/or elements which are configured to operate with the peak current (e.g., peak current IM). Step 1015 may correspond with assembling a magnetic circuit (e.g., magnetic circuit 102). The magnetic circuit may comprise the magnetic core and a winding (e.g., primary coil 107); and the winding may comprise the winding turns number (i.e., turns number N).

As presented herein, one aspect of the teachings is a switching power supply (e.g., switching power supply 100) comprising a magnetic circuit. The magnetic circuit (e.g., magnetic circuits 102, 122, 132, and/or 142) comprises a magnetic core (e.g., core 108), a coil (e.g., primary coil 107), and a magnet (i.e., magnetic component 120) coupled with the magnetic core. The magnetic core is configured to receive an applied magnetomotive force (e.g., applied magnetomotive force $F_A$). The coil is configured to receive an electric current (e.g., primary current $I_P$) and to provide the applied magnetomotive force in proportion to the electric current whereby the applied magnetomotive force varies to a maximum magnetomotive force (e.g., a peak applied magnetomotive force $F_{LIM}$) in response to the electric current transitioning to a fixed peak current (e.g., peak current $I_{IM}$). The magnet is configured to provide an offset to the applied magnetomotive force (e.g., an offset magnetomotive force $F_{OFS}$) whereby the offset is adjusted to be substantially equal to one half an additive inverse of the maximum magnetomotive force. As described herein, the condition of adjusting the offset to be substantially equal to one half an additive inverse of the maximum magnetomotive force may avail a symmetry condition.

The coil (e.g., primary coil 107) may be wrapped around a segment of the magnetic core. The coil may also be wrapped around the magnet. The magnet can be an electromagnet and/or a permanent magnet. The magnetic core may comprise a ferrite. The magnetic core may comprise a gap; and the magnet may be positioned within the gap.

The applied magnetomotive force and the offset to the applied magnetomotive force may induce a total magnetic flux density. The switching power supply may further comprise a second coil (e.g., a secondary coil 109); and the second coil may be configured to provide a second electric current (e.g., secondary current $I_S$) induced by the total magnetic flux density. Additionally, the switching power supply can be a flyback converter (i.e., can be configured as a flyback converter).

In another aspect a method of implementing a magnetic circuit for operating in a switched current system comprises: determining an operating condition of a constant peak-current switching power supply; configuring a magnetic core; configuring a magnet; and coupling the magnet to the magnetic core. The operating condition comprises a peak current (e.g., peak current $I_{LIM}$). The magnetic core includes an air gap and transfers energy with a specified flux density. The magnet is configured to place within the air gap and to induce a flux density substantially equal to one half of the specified peak flux density. The magnet is coupled to the magnetic core with a specified polarity.

The magnetic core may comprise a ferrite; and the magnet may be a permanent magnet. The operating condition may further comprise a peak magnetomotive force (e.g., a peak applied magnetomotive force $F_{LIM}$) induced by a first winding in response to the peak current. Additionally, the polarity may be specified such that the magnet provides an offset magnetomotive force substantially equal to one half an additive inverse of the peak magnetomotive force.

In another aspect a method of reducing audible noise in a power supply comprises: determining an operating condition of a magnetic circuit; and providing an offset magnetomotive force. The operating condition includes a current of a winding and the magnetomotive force induced by the winding in response to the current. The offset magnetomotive force is selected to be substantially equal to one half an additive inverse of a peak value of the magnetomotive force induced by the winding.

In another aspect a method for reducing audible noise in a switching power supply comprises: determining a switching cycle energy; selecting a magnetic core; determining a winding turns number; providing a power supply circuit; and assembling a magnetic circuit. The switching power supply comprises a magnetic circuit. The magnetic core comprises a standard gap and a permanent magnet. The windings turns number is determined in relation to a peak current and a peak flux density. The peak flux density is substantially equal to twice a flux density offset of the magnetic core. The power supply circuit is configured to operate with the peak current. The magnetic circuit comprises a magnetic core and a winding. The winding comprises the winding turns number.

The above description of illustrated examples of the present disclosure, including what is described in the Abstract, are not intended to be exhaustive or to be limitation to the precise forms disclosed. While specific embodiments of, and examples of biasing magnetic circuits to reduce audible noise from a switching power supply are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

What is claimed is:

1. A switching power supply comprising:
    a magnetic circuit comprising:
        a magnetic core configured to receive an applied magnetomotive force;
        a coil configured to receive an electric current and to provide the applied magnetomotive force in proportion to the electric current whereby the applied magnetomotive force varies to a maximum magnetomotive force in response to the electric current transitioning to a fixed peak current; and
        a magnet coupled with the magnetic core and configured to provide an offset to the applied magnetomotive force whereby the offset is adjusted to be substantially equal to one half an additive inverse of the maximum magnetomotive force.
2. The switching power supply of claim 1, wherein the coil is wrapped around a segment of the magnetic core.
3. The switching power supply of claim 1, wherein the coil is wrapped around the magnet.
4. The switching power supply of claim 1, wherein the magnet is an electromagnet.
5. The switching power supply of claim 1, wherein the magnet is a permanent magnet.
6. The switching power supply of claim 1, wherein the magnetic core comprises a ferrite.
7. The switching power supply of claim 1,
    wherein the magnetic core comprises a gap; and
    wherein the magnet is positioned within the gap.
8. The switching power supply of claim 1, wherein the applied magnetomotive force and the offset to the applied magnetomotive force induce a total magnetic flux density.
9. The switching power supply of claim 8, further comprising a second coil, the second coil configured to provide a second electric current induced by the total magnetic flux density.
10. The switching power supply of claim 9,
    wherein the electric current transitions to the fixed peak current during a switching cycle; and
    wherein during the switching cycle the total magnetic flux density varies between a positive value and a negative value.
11. The switching power supply of claim 10, wherein the positive value is substantially equal to the negative value.
12. The switching power supply of claim 10, wherein the switching power supply is a flyback converter.
13. A method of reducing audible noise in a power supply including a magnetic circuit, the method comprising:
    determining an operating condition of the magnetic circuit whereby the operating condition includes a current of a winding and a magnetomotive force induced by the winding in response to the current; and
    providing an offset magnetomotive force, wherein the offset magnetomotive force is selected to be substantially equal to one half an additive inverse of a peak value of the magnetomotive force induced by the winding.
14. The method of claim 13, wherein determining the operating condition of the magnetic circuit comprises:
    determining a peak current in the winding during a switching cycle.
15. The method of claim 13, wherein providing the offset magnetomotive force comprises:
    coupling a magnet to a magnetic core;
    adjusting a dimension of the magnet; and
    placing the magnet in a gap of the magnetic core.
16. The method of claim 15, further comprising:
    wrapping the winding around the magnet.
17. A method of reducing audible noise in a switching power supply comprising a magnetic circuit, the method comprising:
    determining a switching cycle energy;
    selecting a magnetic core, the magnetic core comprising a standard gap and a permanent magnet;
    determining a winding turns number in relation to a peak current and a peak flux density, the peak flux density substantially equal to twice a flux density offset of the magnetic core;
    providing a power supply circuit configured to operate with the peak current; and
    assembling the magnetic circuit comprising the magnetic core and a winding, the winding comprising the winding turns number.
18. The method of claim 17, wherein the determining the switching cycle energy comprises:
    determining a power delivered to a load during a switching cycle.
19. The method of claim 17, wherein the magnetic core is an off-the-shelf (OTS) magnetic core.
20. The method of claim 17, wherein the winding is a primary coil.

* * * * *